(12) United States Patent
Jang et al.

(10) Patent No.: US 7,636,368 B2
(45) Date of Patent: Dec. 22, 2009

(54) APPARATUS AND METHOD FOR CONFIGURING BUFFER DESCRIPTOR SUITABLE FOR PACKET AGGREGATION

(75) Inventors: Kyung-Hun Jang, Suwon-si (KR);
Young-Soo Kim, Seoul (KR);
Jung-Hoon Suh, Yongin-si (KR);
Dong-Jun Lee, Seoul (KR); Hyun-Ki Ahn, Suwon-si (KR); Tae-Jin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 517 days.

(21) Appl. No.: 11/451,969

(22) Filed: Jun. 12, 2006

(65) Prior Publication Data

US 2006/0280194 A1 Dec. 14, 2006

(30) Foreign Application Priority Data

Jun. 10, 2005 (KR) .................. 10-2005-0049624

(51) Int. Cl.
*H04L 12/56* (2006.01)
*H04J 3/04* (2006.01)

(52) U.S. Cl. .................. 370/412; 370/535

(58) Field of Classification Search ......... 370/412, 370/535, 463, 429
See application file for complete search history.

(56) References Cited

U.S. PATENT DOCUMENTS 6,367,045 B1   4/2002   Khan et al.
6,963,577 B1 * 11/2005 Tomonaga et al. ........ 370/412
7,366,194 B2 *  4/2008 Yu et al. .................. 370/429
7,447,230 B2 * 11/2008 Chung et al. ............. 370/463
2003/0135667 A1 * 7/2003 Mann et al. ................ 710/5
2004/0213291 A1 * 10/2004 Beshai et al. ............ 370/473

FOREIGN PATENT DOCUMENTS

KR   1020030077292   10/2003
KR   1020050066807   6/2005

OTHER PUBLICATIONS

Baboescu, F. and Varghese, G, "Scalable Packet Classification", IEEE/ACM Transactions on Networking, vol. 13, No. 1, pp. 2-14.*
Kwangwoon University, Hong-Ju Yeom et al., Mobile-IP, Reliable Multicast Data Transmission Using Cash-Buffer in Mobile-IP Environment, 2004.

* cited by examiner

*Primary Examiner*—John Pezzlo
(74) *Attorney, Agent, or Firm*—The Farrell Law Firm, LLP

(57) ABSTRACT

A buffering apparatus and method for packet aggregation are provided. A buffer buffers packet data to be transmitted on a frame basis. An aggregator represents the positions of the buffered packet data in an Access Category (AC) bitmap and a Traffic Identifier (TID) bitmap according to an AC and a TID of the buffered packet data, and provides a bitmap indicating the positions of packet data to be aggregated according to an aggregation condition to an aggregation controller. The aggregation controller aggregates the packet data based on the bitmap received from the aggregator, constructs an aggregation Physical Service Data Unit (PSDU) with the aggregated packet data, and transmits the aggregation PSDU to a destination.

11 Claims, 20 Drawing Sheets

| 501 AC0/1/2/3/ DESCRIPTOR | | | | | | | |
|---|---|---|---|---|---|---|---|
| WR FLAG | MAX NUM. OF FD | NUM. OF FD QUEUEING IN THIS AC | TX FD INDEX BITMAP | CONFIRMED FD INDEX BITMAP | NUM. OF TID | TID | FD INDEX BITMAP FOR TID | RESERVED |
| 511 | 513 | 515 | 517 | 519 | 521 | 523 | 525 | 527 |

FIG.5B

APPARATUS AND METHOD FOR CONFIGURING BUFFER DESCRIPTOR SUITABLE FOR PACKET AGGREGATION

PRIORITY

This application claims priority under 35 U.S.C. § 119 to an application entitled "Apparatus and Method for Configuring Buffer Descriptor Suitable for Packet Aggregation" filed in the Korean Intellectual Property Office on Jun. 10, 2005 and assigned Ser. No. 2005-49624, the contents of which are incorporated herein by reference.

BACKGROUND OF THE INVENTION

1. Field of the Invention

The present invention relates generally to an apparatus and method for configuring a Buffer Descriptor (BD) suitable for packet aggregation, and in particular, to a BD configuring apparatus and method for allowing easy access to Frame Descriptors (FDs) included in an Access Category (AC) descriptor by representing the indexes of the FDs in the form of a bitmap.

2. Description of the Related Art

The Lower Medium Access Control (LMAC) of a Wireless Local Area Network (WLAN) Mobile MAC is a hardwired MAC, compliant with the Institute of Electrical and Electronics Engineers (IEEE) 802.11 series of standards. The LMAC offers many benefits by implementing the WLAN MAC protocols in hardware, ensuring the flexibility of software.

Software-based implementation of the WLAN MAC protocols will require a memory for executing and storing the software. Since the memory capacity requirement is hundreds of Kbytes, it is a significant burden to a designer. In this context, the LMAC uses a BD control engine in order to manage transmitted/received (Tx/Rx) packets stored in a host memory. A BD has control information and status information of each Tx/Rx frame. For continuous transmission/reception of a plurality of frames, a linked list is made using the BD.

The IEEE 802.1 in standard offers five features to increase MAC efficiency including high throughput and improvement of whole system performance: frame aggregation, power management, bi-directional data flow, channel management and feedback mechanism, and rate adaptation. Among the five features, frame aggregation is significant to high throughput. Because separate transmission of individual frames increases transmission time and results in resource dissipation due to overhead arising from each frame, frames under the same condition are aggregated and transmitted in an aggregated Physical Service Data Unit (PSDU), thereby reducing overhead. However, the conventional IEEE 802.11-based LMAC does not have a BD structure for frame aggregation. Therefore, for packet aggregation in the conventional technology, a BD must be configured for each AC and a new BD must be created for packet aggregation.

FIG. 1 illustrates a BD structure for packet aggregation using ACs in compliance with IEEE 802.11e. Referring to FIG. 1, a memory area in which a BD list 100 is separated from a data buffer 102 is provided for each of ACs 104, 106, 108 and 110 according to the IEEE 802.11e standard. The ACs define a new mechanism for a MAC layer to support Quality of Service (QoS) in the WLAN. Since traffic with a higher priority has an advantage over traffic with a lower priority in terms of medium access, a Mobile Station (MS) classifies traffic into four types, for example, the ACs 104 to 110 (AC0 to AC3) to prioritize the traffic.

The BD list 100 organized on an AC-by-AC basis contains FDs, including the pointer addresses and control and status information of packets buffered in the data buffer 102. A BD list for each AC manages a corresponding data buffer area. Specifically, a BD list 104 for AC0 manages a data buffer 105, a BD list 106 for AC1 manages a data buffer 107, a BD list 108 for AC2 manages a data buffer 109, and a BD list 110 for AC3 manages a data buffer 111. The data buffer 102 is a memory for buffering Tx/Rx packets.

FIGS. 2A and 2B illustrate the structures of conventional Tx FD and Rx FD, respectively. Referring to FIG. 2A, the Tx FD is comprised of an Owner 201, a Data Length 203, a Header Length 205, a Buffer Pointer 207, a Control Information 209, and a Status Information 211.

The Owner 201 indicates the operation status of a user that uses a memory area controlled by the FD. It tells whether the user writes or reads data into or from the memory area. The Data Length 203 indicates the length of Tx packet data, and the Header Length 205 indicates the length of the header of the Tx packet. The Buffer Pointer 207 provides the pointer information of the memory area allocated to the packet, that is, the address of the packet in the data buffer 102. The Control Information 209 provides the data rate and protocol information of the packet and the Status Information 211 indicates the transmission result of the packet.

Referring to FIG. 2B, the Rx FD is comprised of an Owner 221, a Packet Length 223, a Buffer Pointer 225, and a Status Information 227.

The Owner 221 indicates the operation status of the user that uses a memory area controlled by the FD. It indicates whether the user writes or reads data into or from the memory area. The Packet Length 223 indicates the length of an Rx packet, and the Buffer Pointer 225 provides the pointer information of the memory area where the packet is stored, that is, the address of the packet in the data buffer 102. The Status Information 227 indicates the reception result of the packet.

In the logical buffer structure illustrated in FIG. 1, the BD list is searched by condition based on the Tx and Rx FD structures illustrated in FIGS. 2A and 2B to aggregate MAC Protocol Data Units (MPDUs). An MPDU is one packet to be transmitted.

FIG. 3A illustrates conventional aggregation of FDs by Traffic IDentifier (TID). Referring to FIG. 3A, it is shown that packets with the same TID, for example, a TID of 2 are aggregated from the FDs of AC0. FDs 301 with a TID of 2 are aggregated from AC0 by completely searching AC0 in step 303. Packets linked to the aggregated FDs are constructed to a single aggregation PSDU and transmitted to a destination.

A Block ACKnowledgement (ACK) Request (BAR) for the transmitted packets is transmitted to the destination and a Block ACK (BA) is received from the destination in step 305. The BA is a signal that verifies successful transmission of the aggregated packets to the destination. Upon receipt of the BAR for the packets, the destination replies with the BA.

FIG. 3B illustrates conventional aggregation of FDs by AC. Referring to FIG. 3B, it is shown that packets are aggregated from the same AC, for example, AC0 in the BD list. Packets included in AC0 are aggregated by completely searching AC0 and transmitted to a destination in step 307. BARs for the transmitted packets are transmitted to the destination and BAs are received from the destination in step 309. Since a BA has a different sequence for a different TID, BAs are received according to the TIDs of the packets. Therefore, once the BAs are received, the TIDs of the packets are checked in the BD list and the BAs are received according to the TIDs.

FIG. 3C illustrates conventional aggregation of FDs by destination.

Referring to FIG. 3C, it is shown that packets having the same destination (for example, "Dest: 2") are aggregated from the BD list. Packets with the same destination are aggregated by completely searching the BD list and transmitted to a destination in step 311. BARs for the transmitted packets are transmitted to the destination and BAs are received from the destination in step 313. Since a BA has a different sequence for a different TID, BAs are received according to the TIDs of the packets. Therefore, once the BAs are received, the TIDs of the packets are checked in the BD list and the BAs are received according to the TIDs.

As described above, since the conventional IEEE 802.11-based LMAC does not have a BD structure for frame aggregation, it supports BDs using ACs. In aggregating packets by condition (e.g. by TID, by AC, or by destination), an aggregation descriptor searches the entire BD list rather than searching a particular part of the BD list, increasing search overhead. In addition, due to transmission/reception of the BARs/BAs by TIDs, the whole BD list is searched every time a BA is requested or received.

SUMMARY OF THE INVENTION

An object of the present invention is to substantially solve at least the above problems and/or disadvantages and to provide at least the advantages below. Accordingly, an object of the present invention is to provide an apparatus and method for flexibly using a buffer without grouping FDs according to ACs.

Another object of the present invention is to provide an apparatus and method for reducing the overhead of information search by use of a bitmap.

A further object of the present invention is to provide an apparatus and method for estimating the time delay of a next frame by use of a bitmap.

The above objects are achieved by providing a buffering apparatus and method for packet aggregation.

According to one aspect of the present invention, in a buffer apparatus for packet aggregation, a buffer buffers packet data to be transmitted on a frame basis. An aggregator represents the positions of the buffered packet data in an AC bitmap and a TID bitmap according to an AC and a TID of the buffered packet data, and provides a bitmap indicating the positions of packet data to be aggregated according to an aggregation condition to an aggregation controller. The aggregation controller aggregates the packet data based on the bitmap received from the aggregator, constructs an aggregation PSDU with the aggregated packet data, and transmits the aggregation PSDU to a destination.

According to another aspect of the present invention, in a buffering method in a buffer, for packet data aggregation in a transmission mode, packet data are aggregated based on a bitmap indicating the positions of FDs. An aggregation PSDU is constructed with the aggregated packet data and transmitted. Transmission results are written as status information in the FDs of the transmitted packet data.

According to a further aspect of the present invention, in a method of representing the positions of packet data in a buffer descriptor for packet data aggregation, upon generation of transmission packet data, the transmission packet data is allocated to an empty buffer area. An FD is generated for the packet data and linked to a memory address allocated to the packet data. AC information and TID information of the FD are checked and bitmap information in an AC descriptor to which the FD belongs is updated with the AC information and the TID information.

BRIEF DESCRIPTION OF THE DRAWINGS

The above and other objects, features and advantages of the present invention will become more apparent from the following detailed description when taken in conjunction with the accompanying drawings in which:

FIG. 5B illustrates the structure of an AC descriptor according to the present invention;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
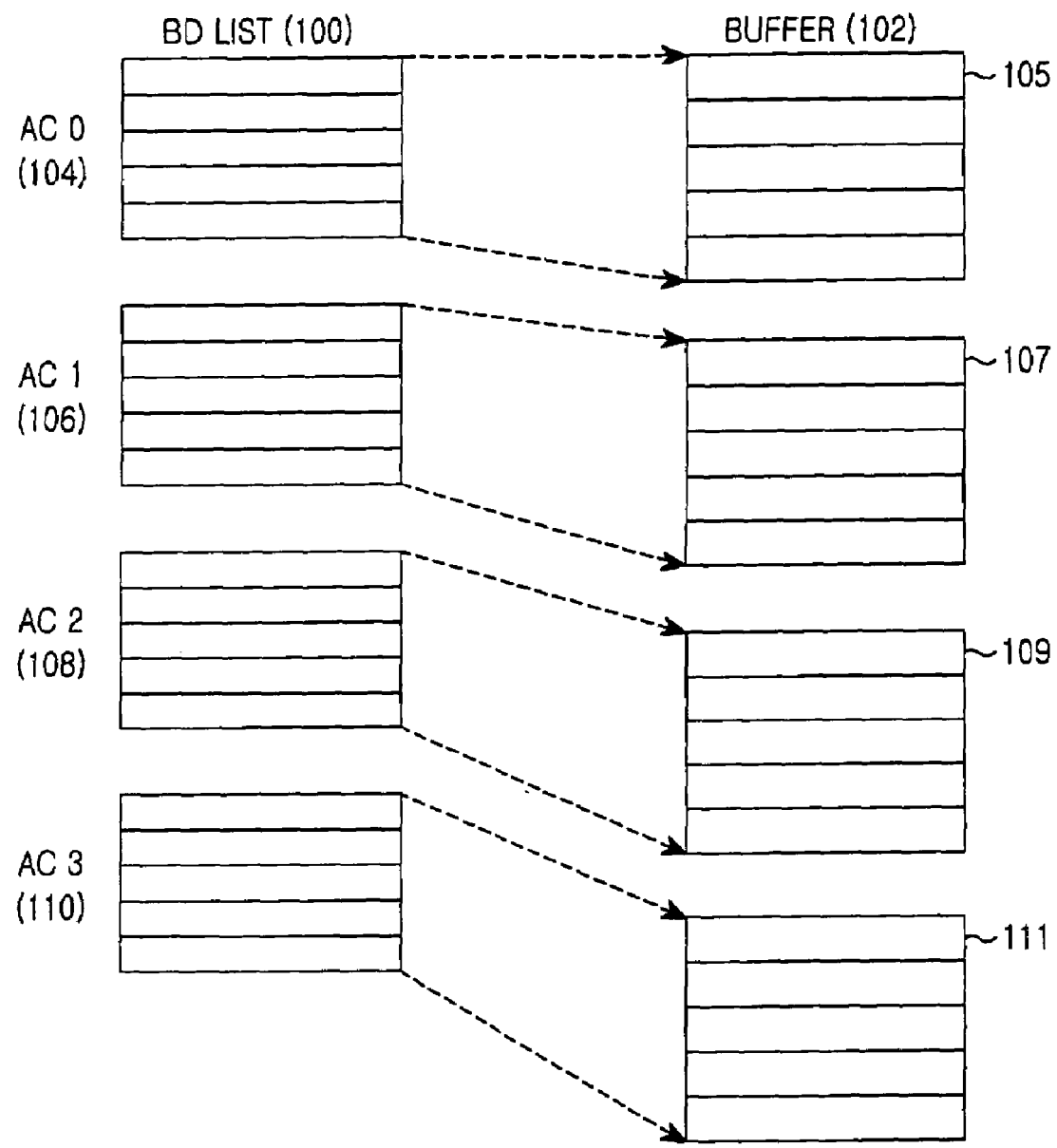
FIG. 1 illustrates a BD structure for packet aggregation using ACs in compliance with IEEE 802.11e.
Figure 2A:
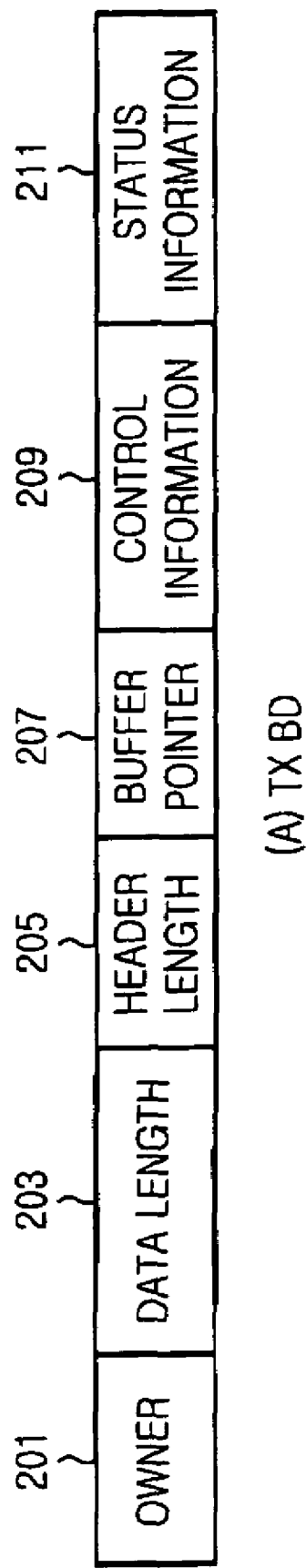
FIGS. 2A and 2B illustrate the structures of conventional Tx and Rx FDs, respectively.
Figure 2B:
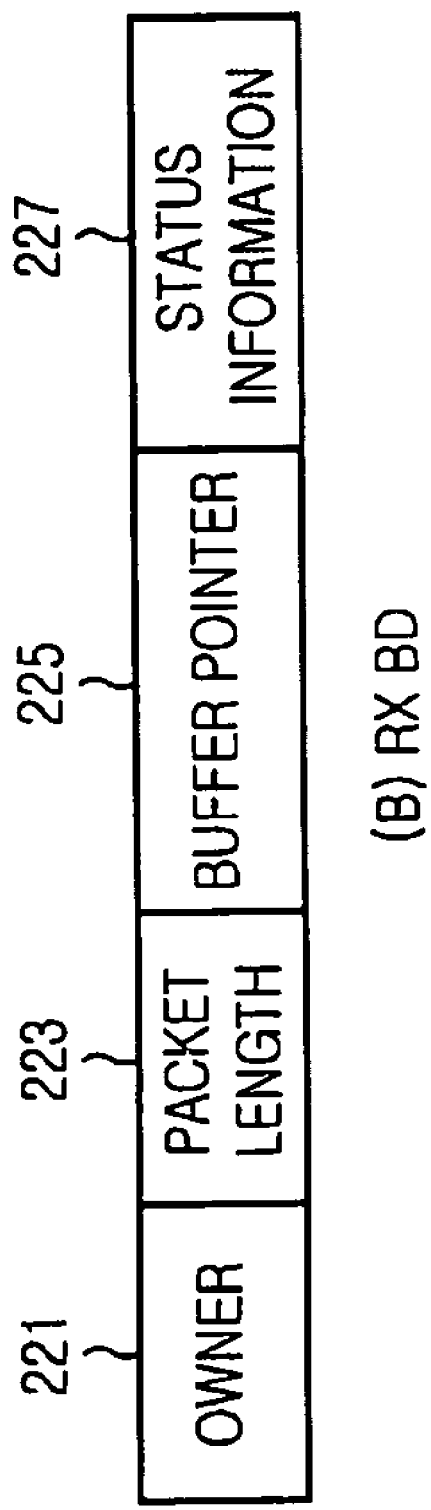
Figure 3A:
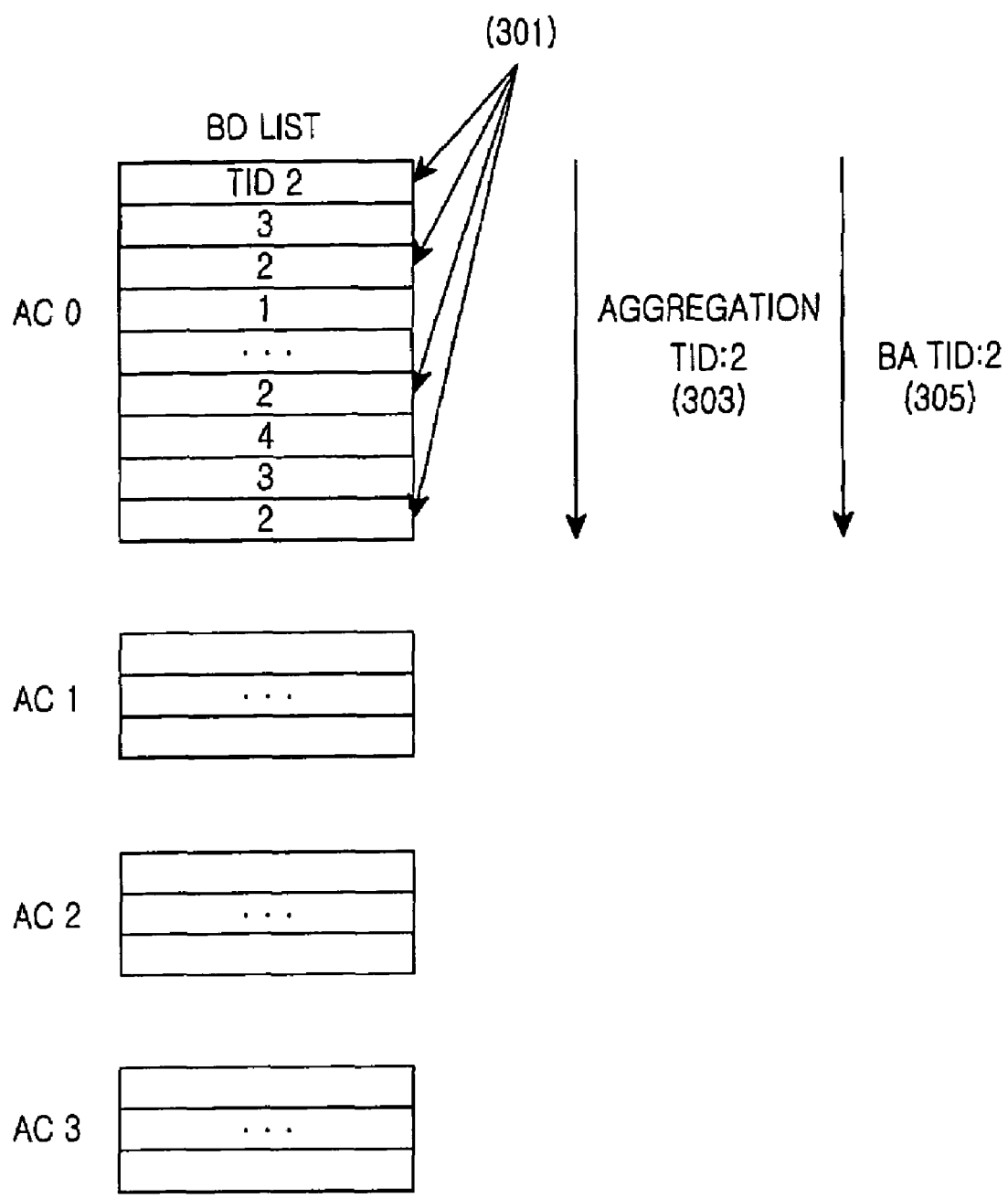
FIG. 3A illustrates conventional aggregation of FDs by TID.
Figure 3B:
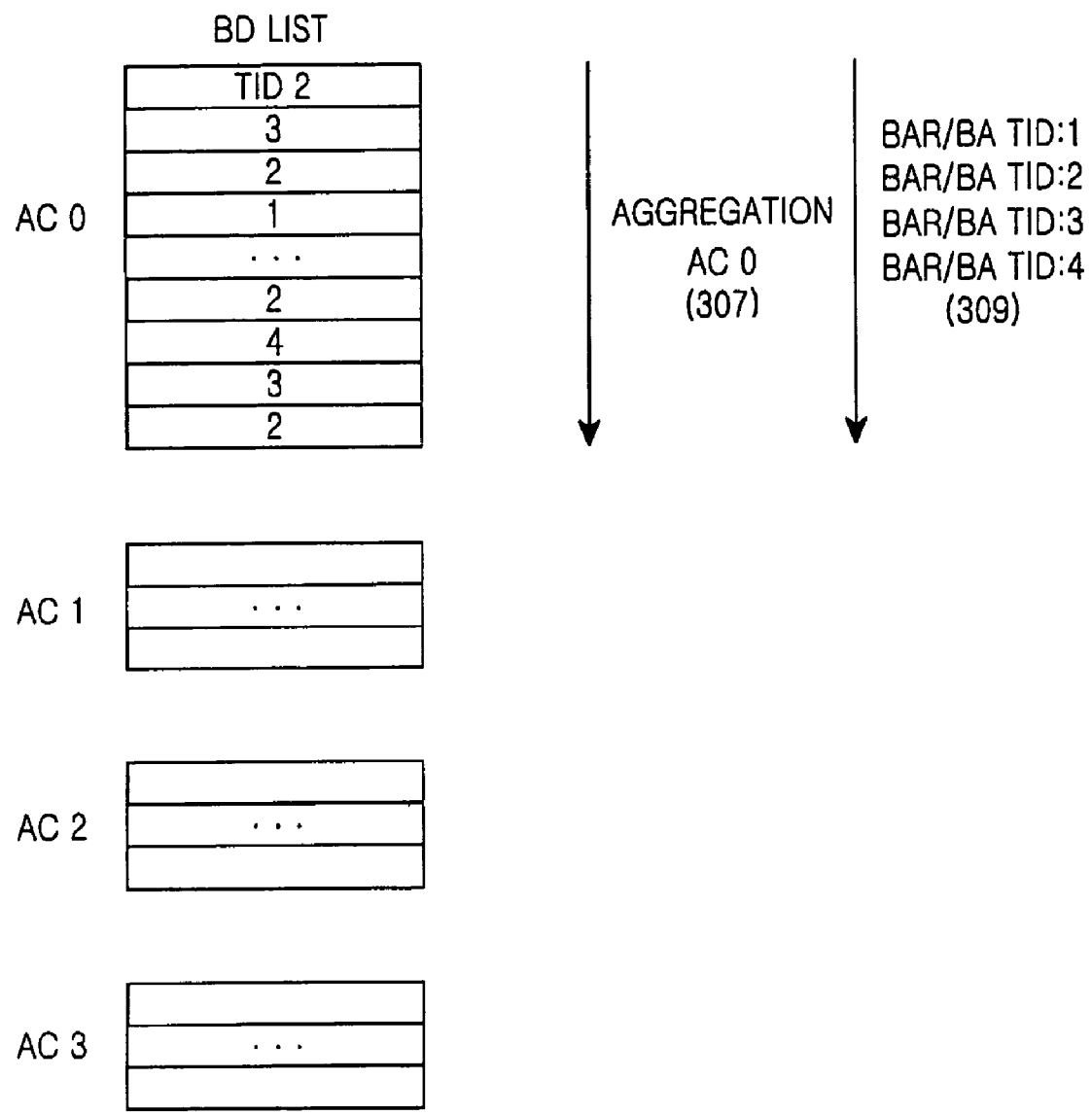
FIG. 3B illustrates conventional aggregation of FDs by AC.
Figure 3C:
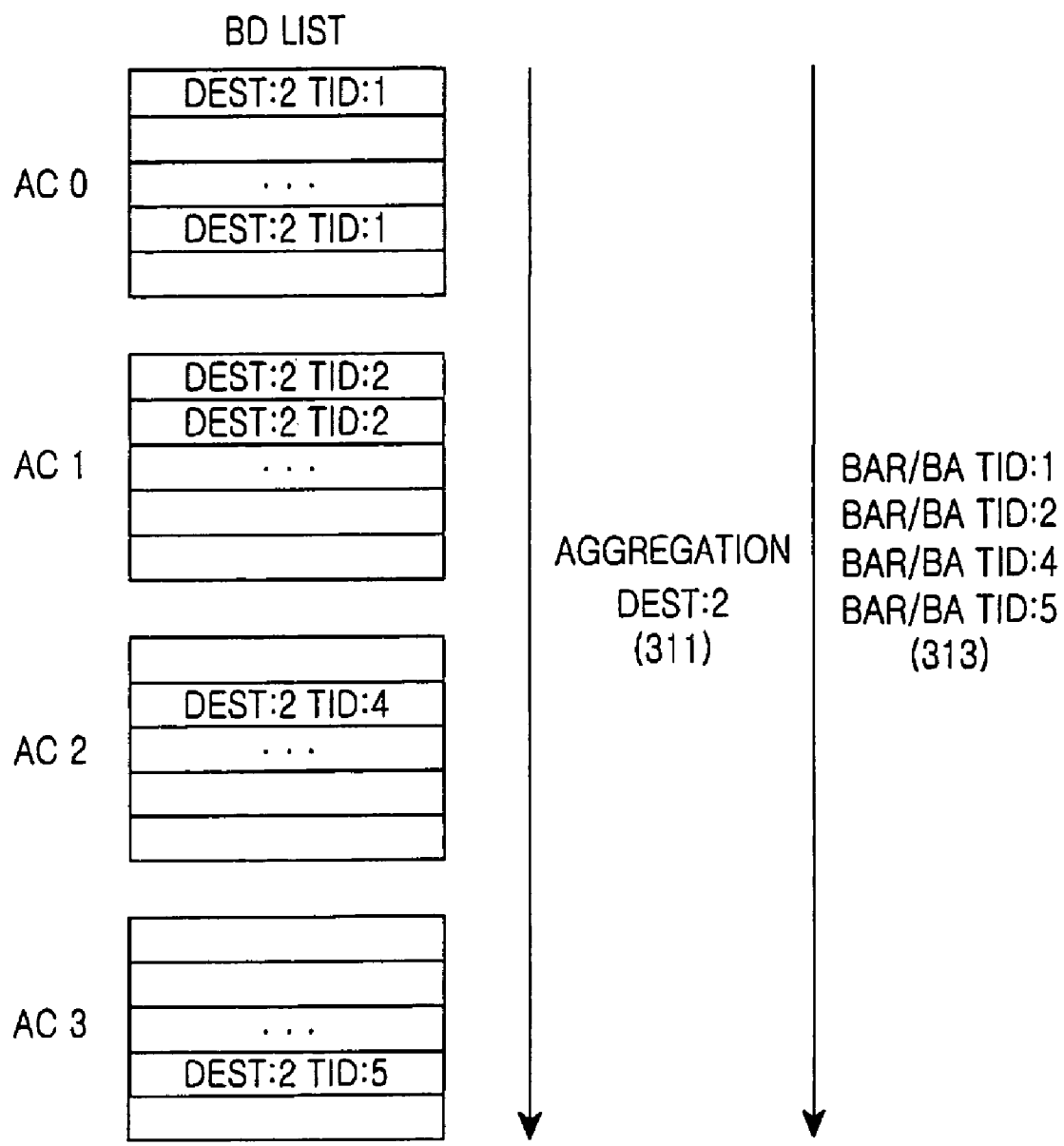
FIG. 3C illustrates conventional aggregation of FDs by destination.
Figure 4:
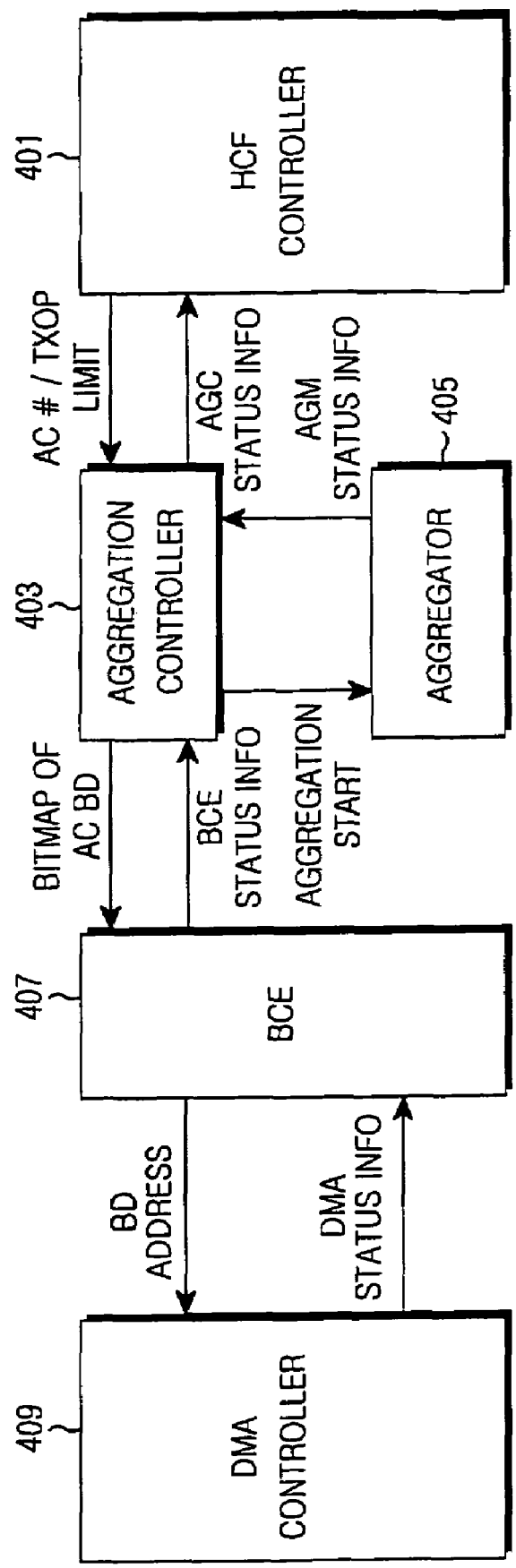
FIG. 4 is a block diagram of a packet aggregation apparatus according to the present invention.

The present invention is intended to provide a novel BD management method for reducing search overhead by use of a bitmap in packet aggregation. FIG. 4 is a block diagram of a packet aggregation apparatus according to the present invention. Referring to FIG. 4, the packet aggregation apparatus includes a High Cycle Fatigue (HCF) controller 401, an aggregation controller 403, an aggregator 405, a Buffer Control Engine (BCE) 407, and a Direct Memory Access (DMA) controller 409.

The HCF controller 401 tells the aggregation controller 403 an interval of time, a Transmitter Opportunity (TXOP) limit, assigned for packet aggregation by an Access Point (AP).

The aggregation controller 403 determines a packet length that can be transmitted during the TXOP limit and aggregates packets to the packet length. It also provides overall control to packet aggregation. When the aggregation controller 403 notifies the aggregator 405 of the start of packet aggregation by an aggregation start signal, the aggregator 405 provides information about the positions of packets to be aggregated in the form of a bitmap to the aggregation controller 403. The aggregation controller 403 transmits the position information to the BCE 407. The BCE 407 then provides the status information and control information of the packets to the aggregation controller 403. Using the status information and control information (e.g. packet lengths and data rates), the aggregation controller 403 determines the number of packets to be transmitted during the TXOP limit.

The aggregator 405 forms the position information of packets in a bitmap. The bitmap represents the indexes of FDs, indicating memory addresses at which the packets are stored. If a packet is added to or deleted from the memory, the aggregation controller 405 updates the bitmap with the index of an FD assigned to the packet under the control of the aggregation controller 403. The DMA controller 409 functions to connect the BCE 407 to the memory areas of the requested packets.

Figure 5A:
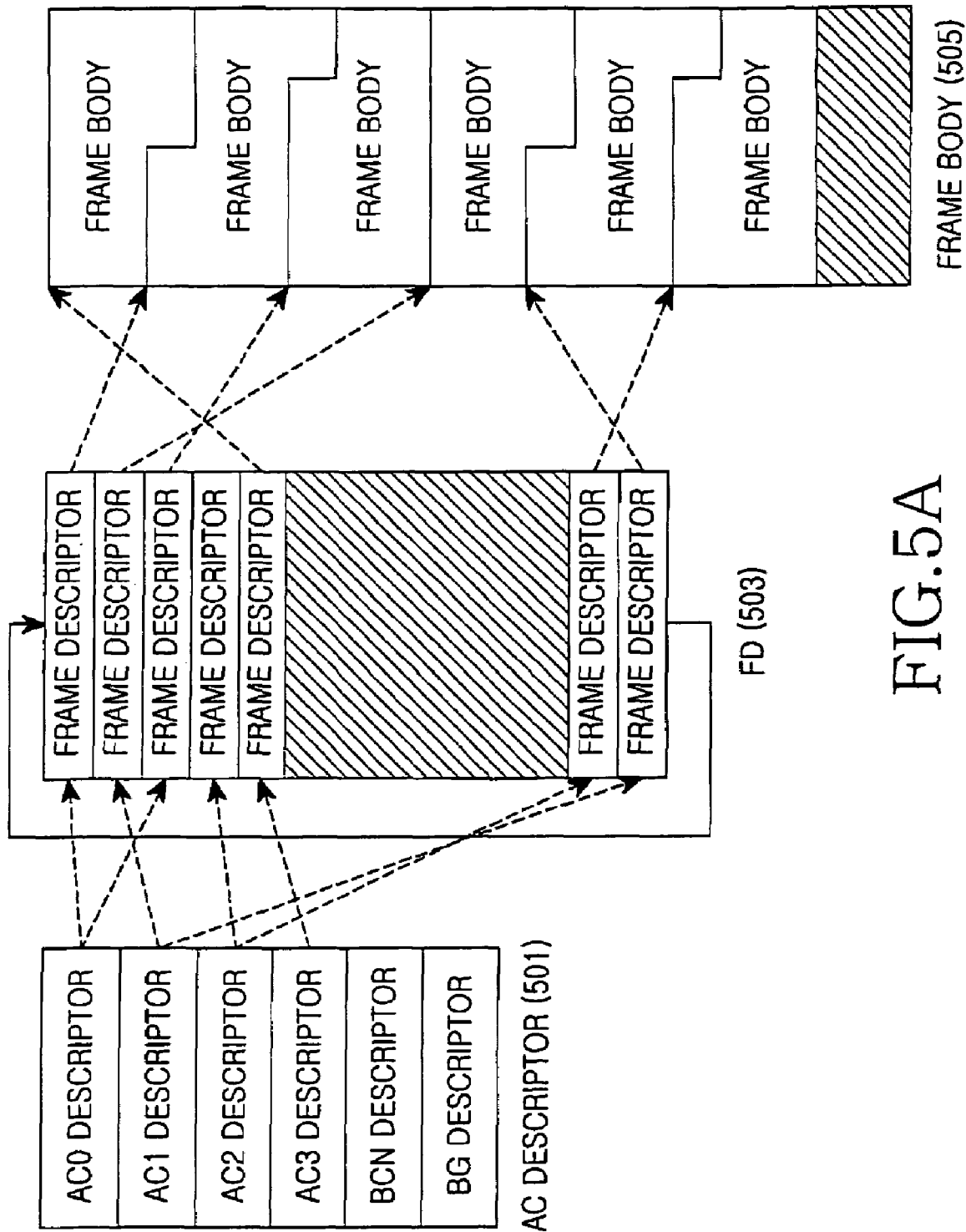
FIG. 5A illustrates a Tx BD management structure according to the present invention.

FIG. 5A illustrates a Tx BD management structure according to the present invention. Referring to FIG. 5A, the Tx BD management structure includes AC descriptors 501, FDs 503, and frame bodies 505. Each AC descriptor 501 has a bitmap indicating the positions of FDs included in the AC, thereby allowing easy access to the FDs. For example, this AC descriptor 501 has the configuration illustrated in FIG. 5B.

Referring to FIG. 5B, in an AC0/1/2/3 descriptor, a WR Flag 511 indicates whether the AC descriptor 501 is to be updated or read. A MAX Num. Of FD 513 indicates the maximum number of FDs 503 in the memory. The maximum FD number is equal to the length of a Tx FD Index Bitmap 517 or the length of a Confirmed FD Index Bitmap 519. A Num. Of FD Queueing in this AC 515 indicates the number of FDs included in this AC (e.g. AC0, AC1, AC2 or AC3).

The Tx FD Index Bitmap 517 represents the positions of the FDs included in the AC. The bitmap has as many bits as the total number of FDs in the memory and only bits corresponding to the indexes of the FDs included in the AC are set to is in the bitmap.

The Confirmed FD Index Bitmap 519 has 1s at the positions of the indexes of the FDs of packets for which BAs have been received after the packets were aggregated and transmitted, to thereby confirm reception of the BAs for the packets. Thus, the FDs for which the BAs have been received are easily found, as described in FIG. 13 in detail.

A Num. Of TID 521 indicates the number of TID types (e.g. TID 1, TID 2 and TID 3) existing in the AC. A TID field 523 provides the indexes of the TIDs. An FD Index bitmap for TID 525 represents the indexes of FDs having each of the TIDs indicated by the TID field 523. A Reserved 527 is a reserved field.

Referring to FIG. 5A again, each FD 503 points the memory area of a packet. The FDs 503 are arranged in an annular recursive array. For example, the FDs 503 each has the configuration illustrated in FIG. 5C.

Figure 5C:
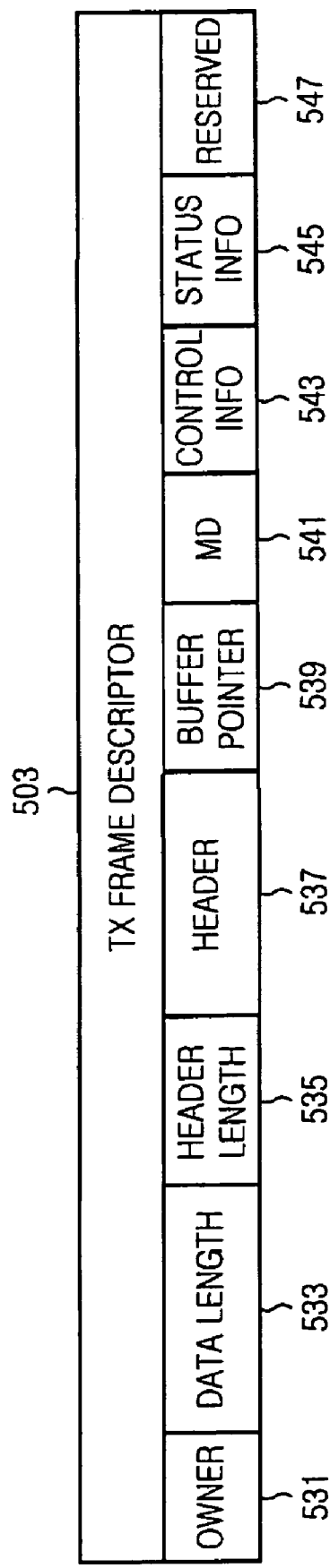
FIG. 5C illustrates the structure of a Tx FD according to the present invention.

Referring to FIG. 5C, an Owner 531 indicates the operation of the user that uses a memory area assigned to the FD. That is, if the Owner 531 indicates that the user writes data in the memory area, it is set to Host. If the Owner 531 indicates that the user reads data from the memory area, it is set to LMAC.

A Data Length 533 indicates the length of transmission packet data, and a Header Length 535 indicates the length of the header of the packet.

A Header 537 is the header of the packet and a Buffer Pointer 539 provides the pointer information of the memory area allocated to the packet, that is, the memory address of the packet. An MPDU Delimiter (MD) 541 identifies the packet in an aggregation PSDU containing packets aggregated by the same condition. A Control Info 543 provides the data rate and protocol information of the packet and a Status Info 545 indicates the transmission result of the packet. A Reserved 527 is a reserved field.

Referring to FIG. 5A again, the frame bodies 505 correspond to the memory areas of the transmission packets, pointed by the buffer pointers 539 of the FDs 503.

Figure 6A:
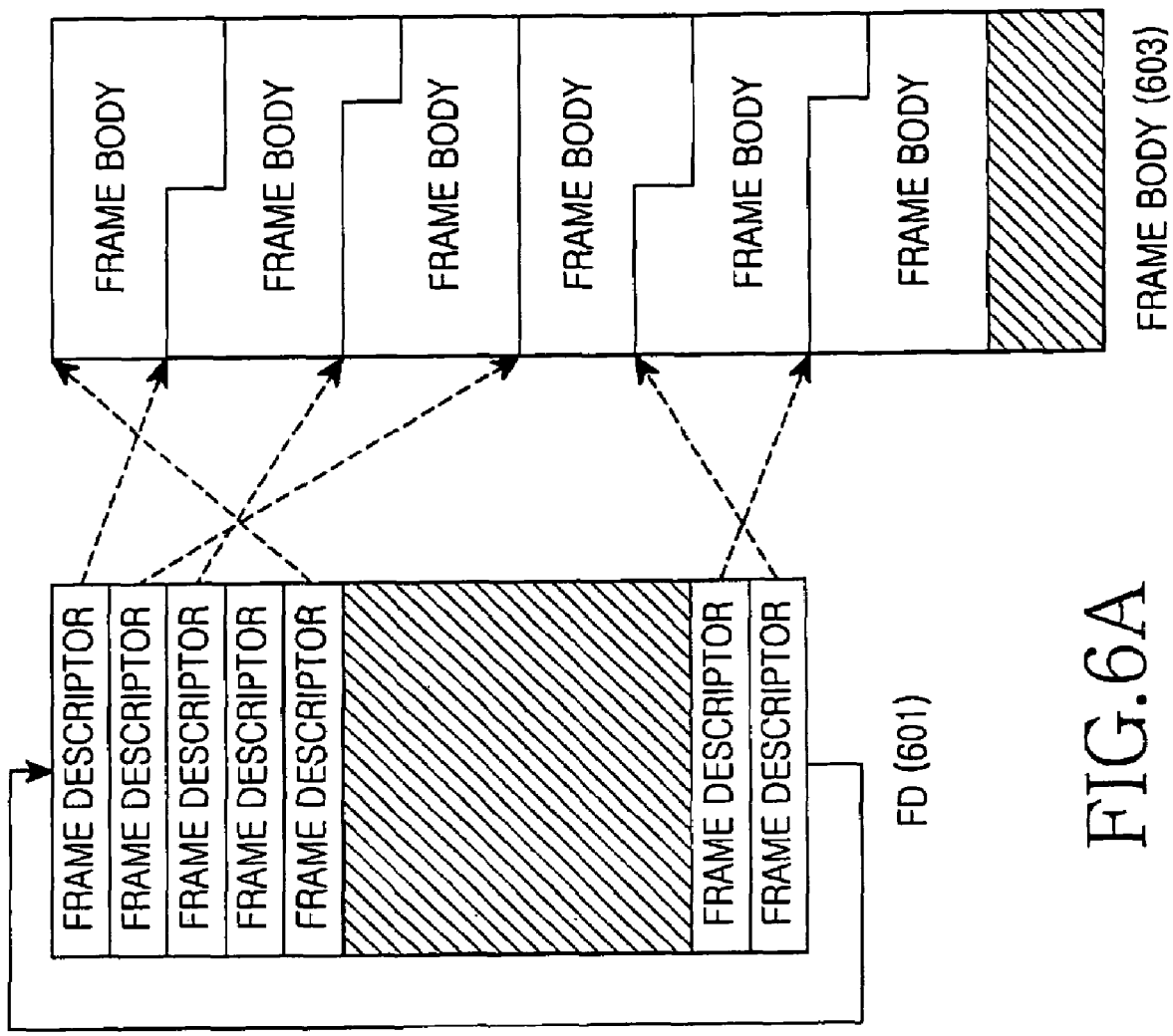
FIG. 6A illustrates an Rx BD management structure according to the present invention.

FIG. 6A illustrates an Rx BD management structure according to the present invention. Referring to FIG. 6A, the Rx BD management structure is comprised of FDs 601 and frame bodies 603, for management of an Rx buffer. The FDs 601 are of an annular structure and manage the Rx buffer. For example, the FDs 601 have the configuration illustrated in FIG. 6B.

Figure 6B:
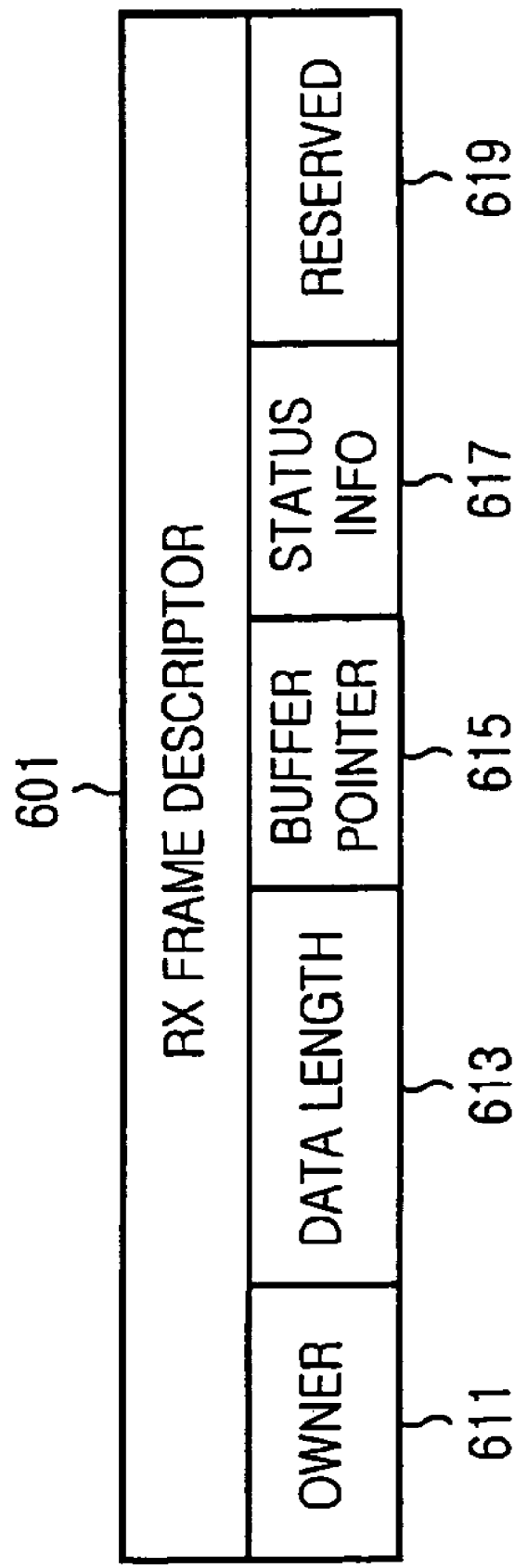
FIG. 6B illustrates the structure of an Rx FD according to the present invention.

Referring to FIG. 6B, an Owner 611 indicates the operation status of the user that uses the memory area. If the user writes data in the memory area, it is set to LMAC. If the user reads data from the memory, it is set to Host. A Data Length 613 indicates the length of Rx packet data, and a Buffer Pointer 615 points the memory area where the Rx packet data has been stored, that is, the memory address of the Rx packet. A Status Info 617 indicates the reception result of the packet.

Figure 7:
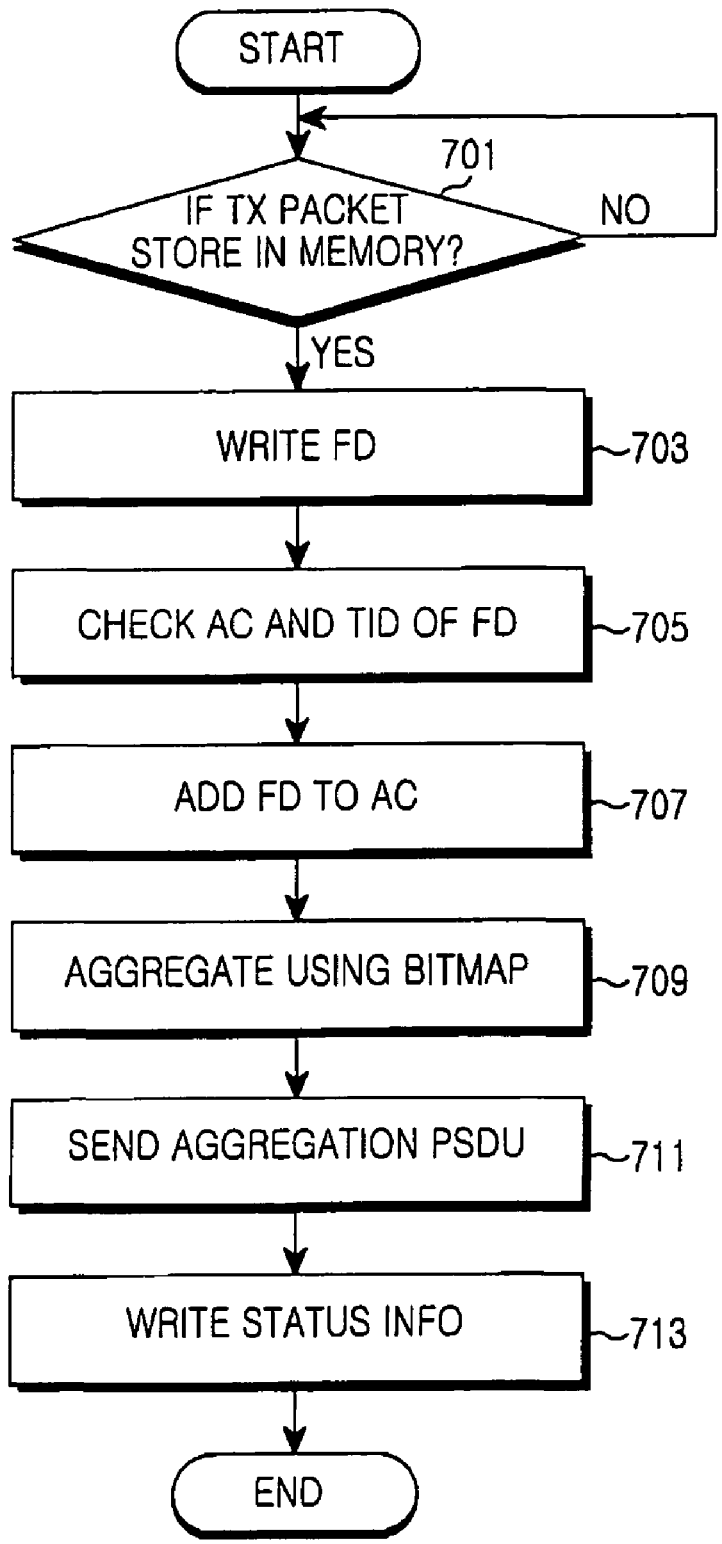
FIG. 7 is a flowchart illustrating an operation for aggregating Tx packets according to an embodiment of the present invention.

FIG. 7 is a flowchart illustrating a Tx packet aggregation operation according to the present invention. Referring to FIG. 7, upon generation of a Tx packet, the aggregation controller 403 stores the Tx packet in an empty memory area in step 701. In step 703, the aggregation controller 403 writes an FD for managing the stored Tx packet. Specifically, the memory address of the packet in the buffer is linked to the FD having the structure illustrated in FIG. 5C and fills the control information of the packet (e.g. data rate and protocol information) in the FD.

Figure 9:
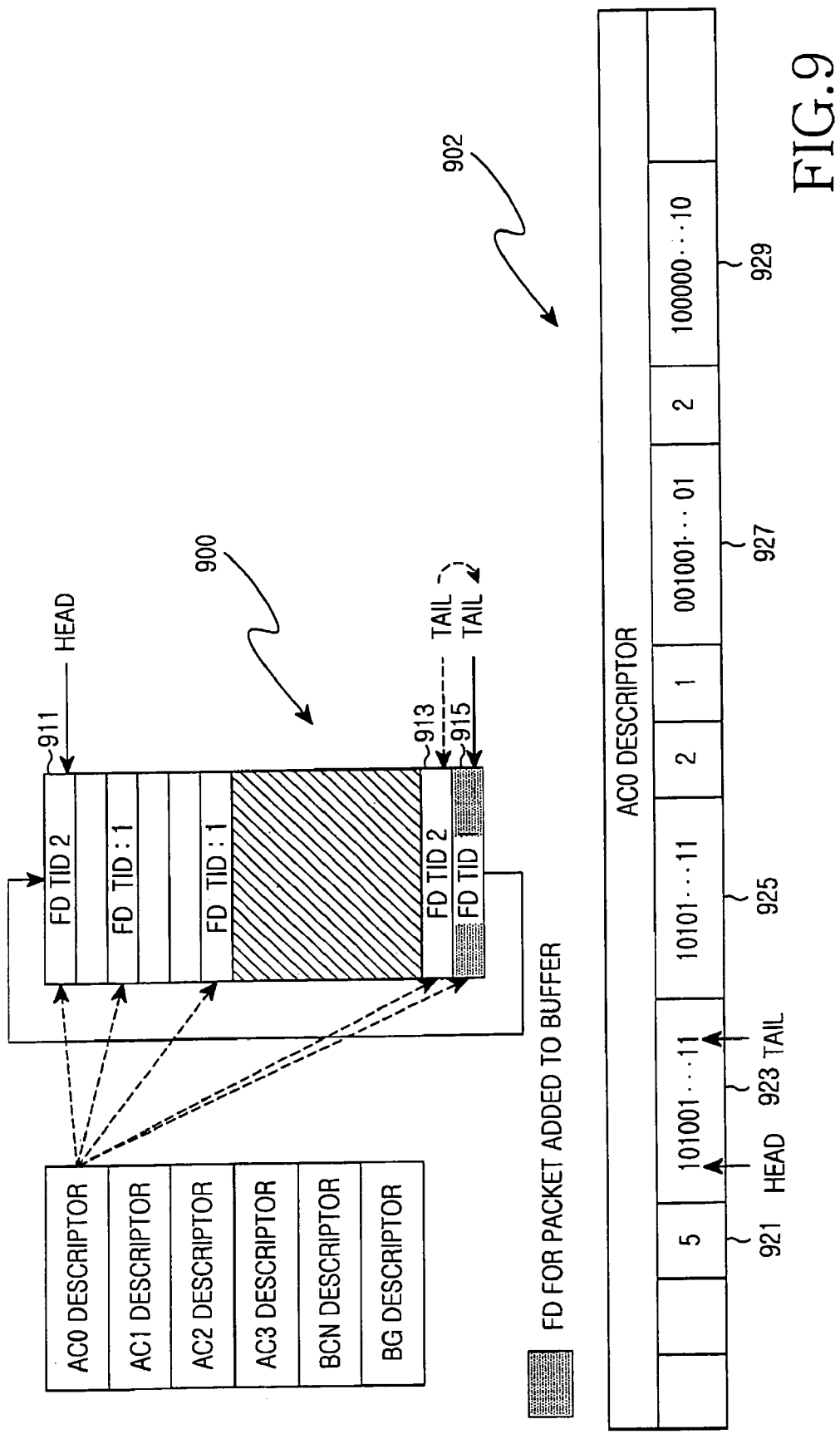
FIG. 9 illustrates addition of a new FD according to the present invention.

The aggregation controller 403 checks the AC and TID of the packet in step 705 and adds the FD to a corresponding AC descriptor in step 707, as illustrated in FIG. 9.

Referring to FIG. 9, reference numeral 900 denotes addition of the FD of a packet to the AC0 descriptor and reference numeral 902 denotes the structure of the AC0 descriptor having the FD added thereto.

The index of a first FD 911 and the index of a last FD 913 are the header and tail indexes of the AC0 descriptor, respectively. When an FD 915 with a TID of 1 is added to the AC0 descriptor, a device driver sets the index of the added FD 915 as the tail index by moving down the tail index of the BD array pointing to the last FD 913 using a tail register.

With the FD 915 added, the Num. Of FD Queueing in this AC 515 of the AC0 descriptor is set to 5 as indicated by reference numeral 921 because AC0 includes five FDs in total. The Tx FD Index Bitmap 517 of the AC0 descriptor is added with 1 at the end, for example, from 101001 . . . 1 to 101001 . . . 11 as indicated by reference numeral 923. Upon receipt of a BA for the added FD, the Confirmed FD Index Bitmap 519 is added with 1 at the end, for example, from 101001 . . . 11 to 101001 . . . 11 as indicated by reference numeral 925. Since the TID of the added FD is 1, an FD Index bitmap for TID 1 927 is added with 1 at the end, for example, from 001001 . . . 0 to 001001 . . . 01, and an FD Index bitmap for TID 2 929 is added with 0 at the end, for example, from 100000 . . . 1 to 100000 . . . 10.

Referring to FIG. 7 again, the aggregation controller 403 aggregates packets using the bitmaps of the AC descriptors by an intended condition in step 709, which will be described in more detail with reference to FIGS. 11 and 12. In step 711, the aggregation controller 403 constructs the aggregated packets to an aggregation PSDU and transmits the aggregation PSDU to a destination on a physical channel. The aggregation controller 403 then writes the transmission results of the packets in the Status Info fields 545 of the FDs of the packets in step 713.

Figure 10:
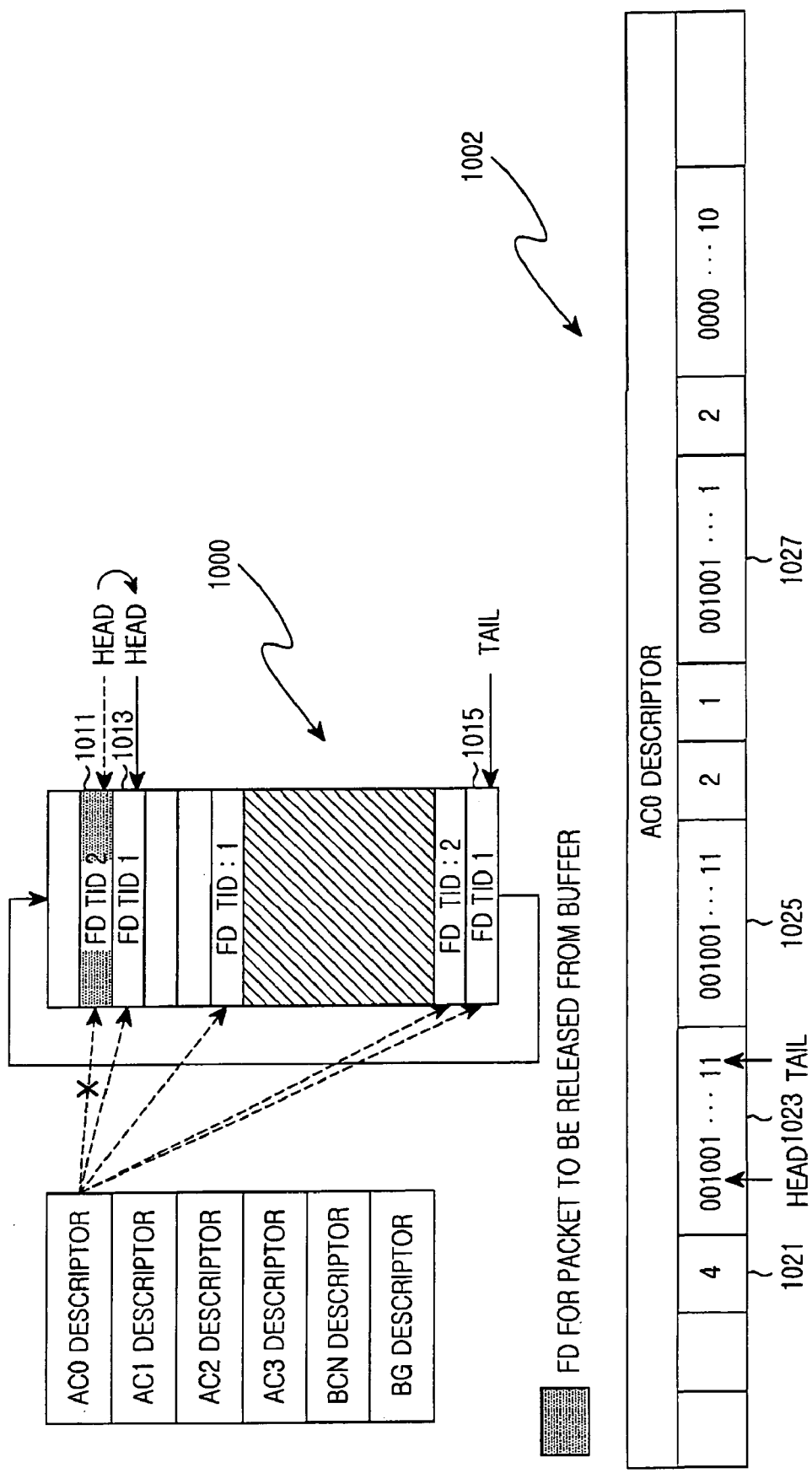
FIG. 10 illustrates initialization of an FD for which a BA has been received according to the present invention.

While not shown, upon receipt of BAs for the packets, the FDs of the packets are initialized as illustrated in FIG. 10. Referring to FIG. 10, reference numeral 1000 denotes initialization of the FD of a packet for which a BA has been received in the AC0 descriptor. Reference numeral 1002 denotes the AC0 descriptor with the FD initialized.

The header and tail indexes of the AC0 descriptor are the indexes of a first FD 1011 and a last FD 1015, respectively. Upon receipt of a BA for the first FD 1011, the device driver initializes the FD 1011 and sets the index of an FD 1013 as the header index by shifting a Tx/Header register one level down.

Due to the initialization of the FD 1011, the AC0 descriptor 1002 now has four FDs. Thus, the Num. Of FD Queueing in this AC 515 is set to 4, as indicated by reference numeral 1021. The first 1 of the Tx FD Index bBitmap 517 is updated to 0, for example, from 011001 . . . 11 to 001001 . . . 11 and thus the header index is set to the index of the FD 1013, as indicated by reference numeral 1023. Also, the first 1 of the Confirmed FD Index Bitmap 519 is updated to 0, for example, from 011001 . . . 11 to 001001 . . . 11, as indicated by reference numeral 1025.

Since the TID of the initialized FD 1011 is 2, a bit corresponding to the index of the FD 1011 is updated to 0 in an FD Index bitmap for TID 2 1027, for example, from 010000 . . . 10 to 000000 . . . 10. Referring to FIG. 7 again, the aggregation controller 403 then ends the packet transmission algorithm.

Figure 8:
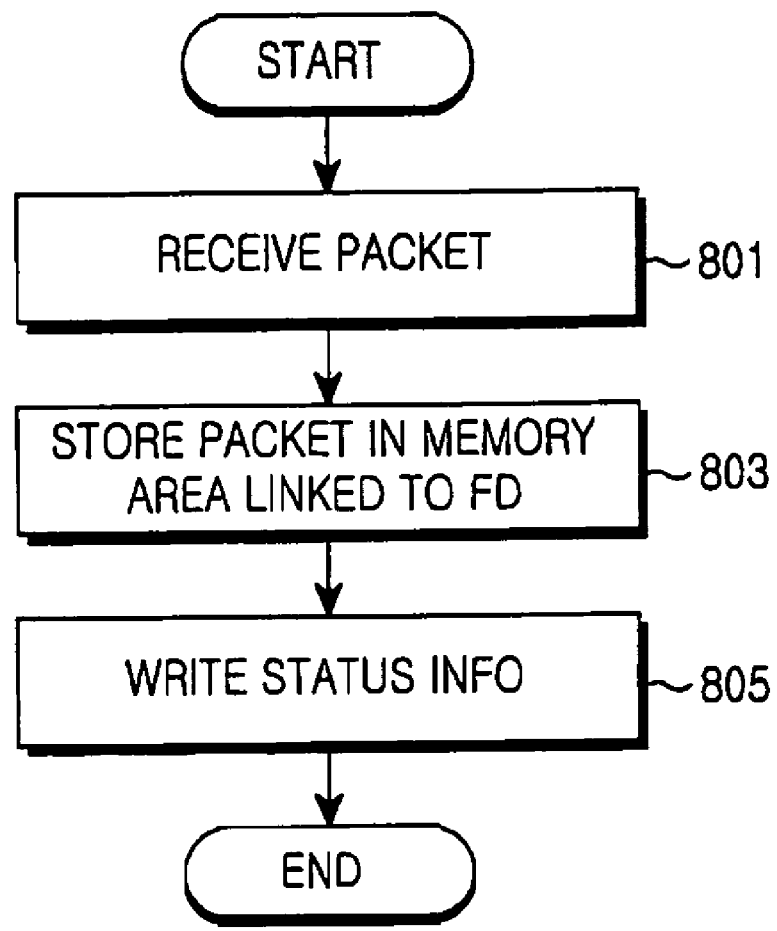
FIG. 8 is a flowchart illustrating an operation for aggregating Rx packets according to the present invention.

FIG. 8 is a flowchart illustrating an Rx packet aggregation operation according to the present invention. Referring to FIG. 8, upon receipt of a packet on a physical channel in step 801, the aggregation controller 403 stores the Rx packet in an empty memory area and forms an FD for managing the stored Rx packet. Specifically, the memory address of the packet is linked to the FD in step 803. The aggregation controller 403 then writes the reception result of the packet in the Status Info 617 of the FD in step 805. The aggregation controller 403 then ends the packet reception algorithm.

Figure 11:
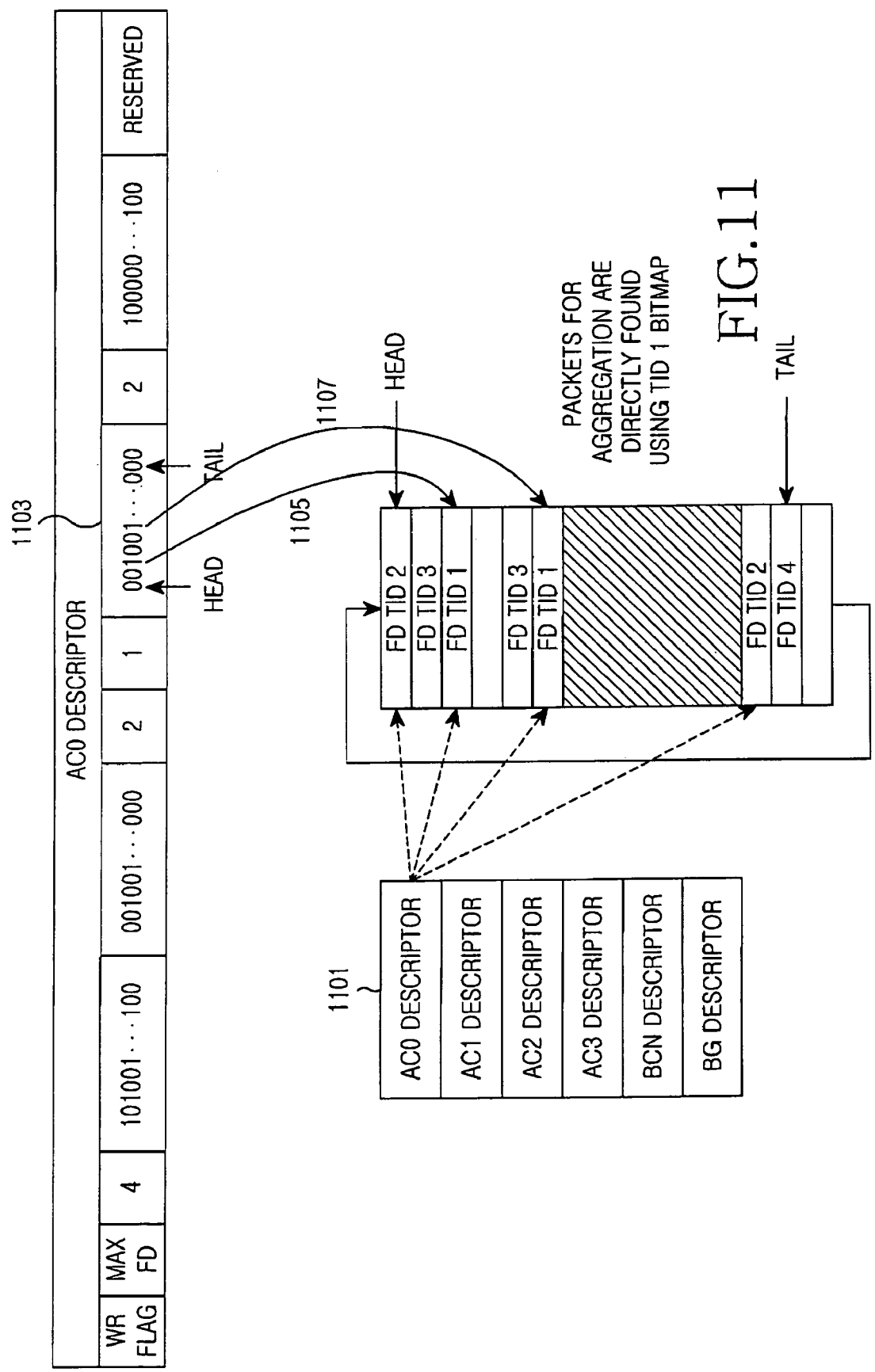
FIG. 11 illustrates FD aggregation by TID according to the present invention.

FIG. 11 illustrates FD aggregation by TID according to the present invention. In the illustrated case of FIG. 11, FDs having a TID of 1 are searched for in an AC0 descriptor 1101. A TID bitmap for TID 1 1103 of the AC0 descriptor 1101 is checked and FDs whose indexes are set to 1s in the bitmap are aggregated in steps 1105 and 1107.

Figure 12:
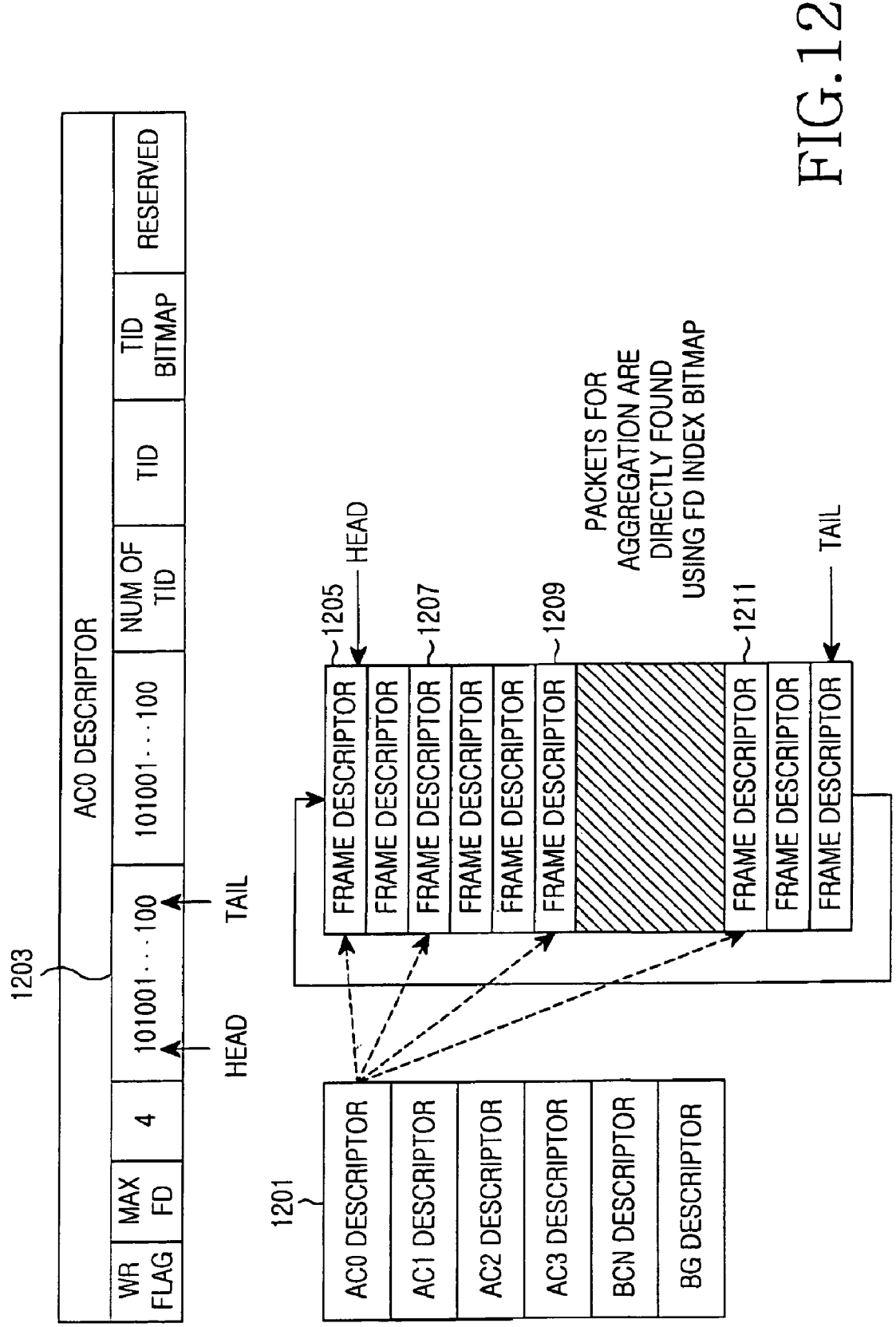
FIG. 12 illustrates FD aggregation by AC according to the present invention.

FIG. 12 illustrates FD aggregation by AC according to the present invention. In the illustrated case of FIG. 12, FDs belonging to an AC0 descriptor are aggregated. A bitmap 1203 indicating the positions of FDs of the AC0 descriptor 1201 is checked and FDs whose indexes are set to 1s in the bitmap are aggregated.

Figure 13:
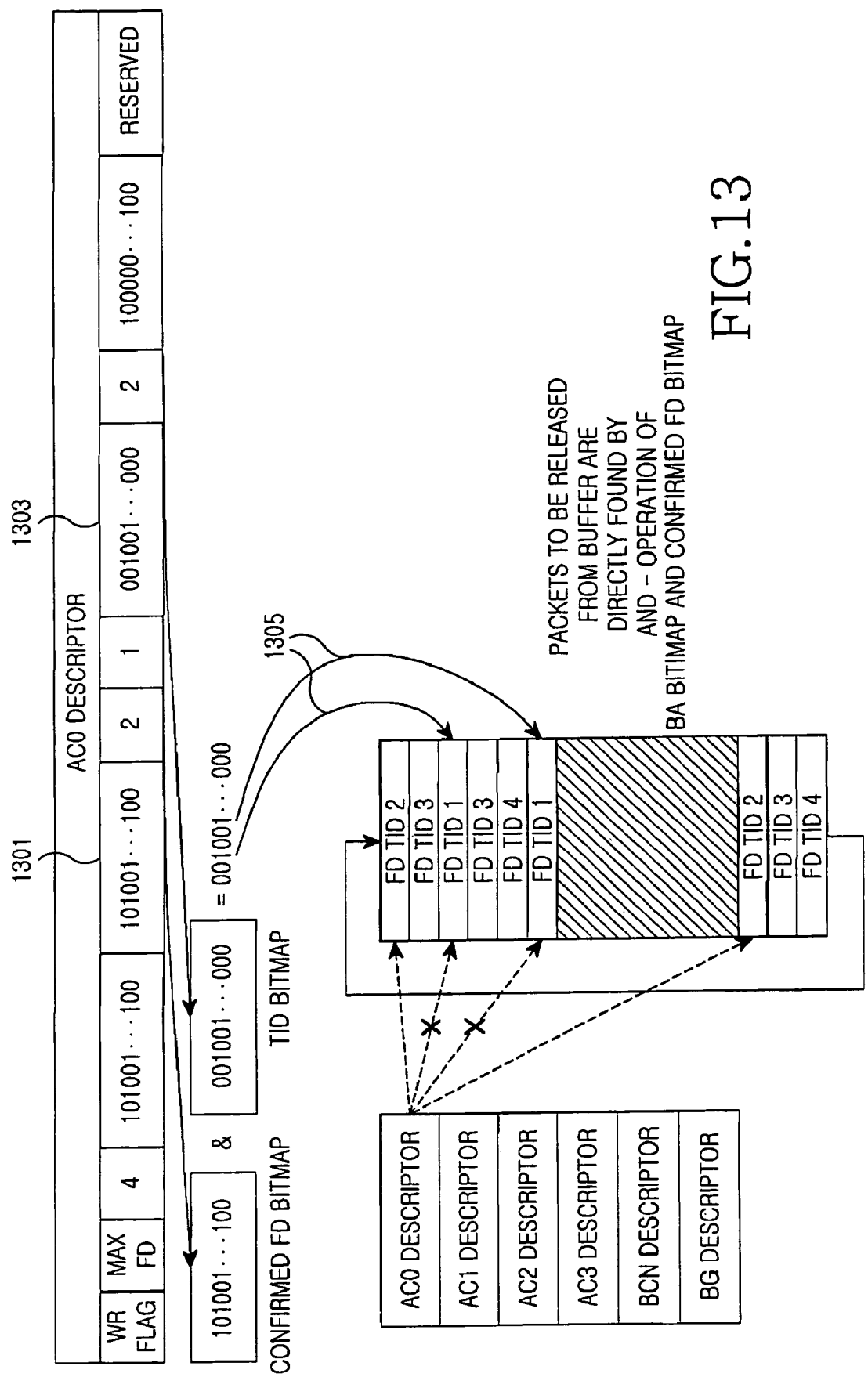
FIG. 13 illustrates confirmation of BA reception according to the present invention.

FIG. 13 illustrates BA reception confirmation according to the present invention. In the illustrated case of FIG. 13, BA reception for FDs with a TID of 1 is checked. A Confirmed FD bitmap 1301 in which the indexes of FDs for which BAs have been received are set to 1s are AND-operated with a TID 1 bitmap 1303 indicating the positions of the FDs having a TID of 1. Thus, it is determined whether BAs have been received for the FDs having a TID of 1 in step 1305.

Figure 14:
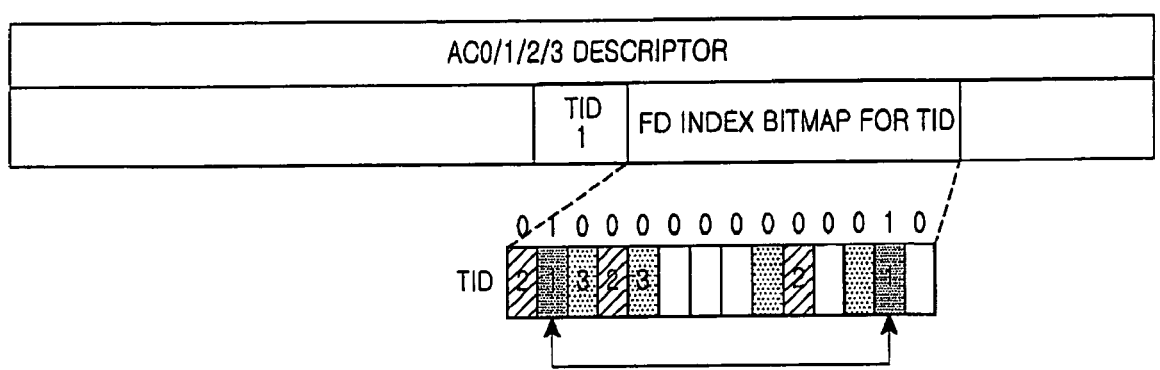
FIG. 14 illustrates estimation of the time delay of a next frame having the same TID according to the present invention.

FIG. 14 illustrates an estimation of the time delay of a next frame with the same TID according to the present invention. It is assumed herein that transmission of each packet takes the same time.

Referring to FIG. 14, the number of bits between 1s in a bitmap for an FD having a TID of 1 is known. That is, the number of frames having different TIDs between frames having a TID of 1 can be calculated. Thus, the time delay between FDs having a TID of 1 can be determined. As described above, the present invention advantageously reduces the overhead of TID search in packet aggregation and thus an aggregation search time. In addition, since the time delay of traffic with the same TID can be roughly estimated, FDs with the same TID can be selectively discarded, thereby improving QoS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A buffer apparatus for packet data aggregation, comprising:
   a buffer for buffering packet data to be transmitted on a frame basis;
   an aggregator for representing positions of the buffered packet data in a Frame Descriptor (FD) bitmap and a Traffic Identifier (TID) bitmap according to a predetermined Access Category (AC) and a TID of the buffered packet data, and providing a bitmap indicating the positions of packet data to be aggregated according to an aggregation condition to an aggregation controller; and
   the aggregation controller for aggregating the packet data based on the bitmap received from the aggregator, constructing an aggregation Physical Service Data Unit (PSDU) with the aggregated packet data, and transmitting the aggregation PSDU to a destination,
   wherein bits of the FD bitmap and TID bitmap correspond on a one-to-one basis to indexes of FDs managing memory addresses of the buffered packet data,
   wherein the FD bitmap indicates the positions of FDs in the predetermined AC, and
   wherein the TID bitmap indicates the positions of FDs having a predetermined TID in the predetermined AC.

2. The buffer apparatus of claim 1, further comprising a Buffer Control Engine (BCE) for receiving the bitmap indicating the positions of the packet data to be aggregated and providing control information about the packet data to the aggregation controller, wherein the aggregation controller determines a length of the packet data to be aggregated based on the control information received from the BCE, and wherein the bitmap includes the FD bitmap and the TID bitmap.

3. The buffer apparatus of claim 2, wherein the control information includes the length and a data rate of the packet data to be aggregated.

4. A buffering method in a buffer, for packet data aggregation in a transmission mode, comprising the steps of:
   aggregating packet data based on a bitmap indicating positions of Frame Descriptors (FDs);
   constructing an aggregation Physical Service Data Unit (PSDU) with the aggregated packet data, and transmitting the aggregation PSDU to a destination; and
   writing transmission results as status information in FDs of the transmitted packet data, wherein the bitmap includes an FD bitmap indicating the positions of the FDs included in a predetermined Access Category (AC) and a Traffic IDentifier (TID) bitmap indicating FDs having a predetermined TID in the predetermined AC, and wherein bits of the FD bitmap and TID bitmap correspond on a one-to-one basis to indexes of FDs managing memory addresses of buffered packet data.

5. The buffering method of claim 4, wherein the FDs of the transmitted packet data manage buffer addresses allocated to the packet data.

6. A method of representing the positions of packet data in a buffer descriptor for packet data aggregation, comprising the steps of:

allocating, upon generation of transmission packet data, the transmission packet data to an empty buffer area;

generating a Frame Descriptor (FD) for the packet data and linking the FD to a memory address allocated to the packet data;

checking Access Category (AC) information and Traffic Identifier (TID) information of the FD; and updating bitmap information in an AC descriptor to which the FD belongs, using the AC information and the TID information, wherein the bitmap information includes an FD bitmap indicating the positions of FDs included in a predetermined AC and a TID bitmap indicating FDs having a predetermined TID in the predetermined AC, and wherein bits of the FD bitmap and TID bitmap correspond on a one-to-one basis to indexes FDs managing memory addresses of buffered packet data.

7. The method of claim 6, wherein the FD manages the memory address allocated to the packet data.

8. The method of claim 6, wherein the updating step comprises updating the FD bitmap indicating positions of FDs included in the AC and the TID bitmap indicating positions of FDs having the same TID in the AC.

9. A telecommunication system for packet data aggregation, comprising:

a buffer for buffering packet data to be transmitted on a frame basis;

an aggregator for representing positions of the buffered packet data in a Frame Descriptor (FD) bitmap and a Traffic Identifier (TID) bitmap according to a predetermined Access Category (AC) and a TID of the buffered packet data, and providing a bitmap indicating the positions of packet data to be aggregated according to an aggregation condition to an aggregation controller; and the aggregation controller for aggregating the packet data based on the bitmap received from the aggregator, constructing an aggregation Physical Service Data Unit (PSDU) with the aggregated packet data, and transmitting the aggregation PSDU to a destination, wherein bits of the FD bitmap and TID bitmap correspond on a one-to-one basis to indexes of FDs managing memory addresses of the buffered packet data, wherein the FD bitmap indicates the positions of FDs in the predetermined AC, and wherein the TID bitmap indicates the positions of FDs having a predetermined TID in the predetermined AC.

10. The telecommunication system of claim 9, further comprising a Buffer Control Engine (BCE) for receiving the bitmap indicating the positions of the packet data to be aggregated and providing control information about the packet data to the aggregation controller, wherein the aggregation controller determines a length of the packet data to be aggregated based on the control information received from the BCE.

11. The telecommunication system of claim 10, wherein the control information includes the length and a data rate of the packet data to be aggregated.

* * * * *

UNITED STATES PATENT AND TRADEMARK OFFICE
CERTIFICATE OF CORRECTION

PATENT NO. : 7,636,368 B2  Page 1 of 1
APPLICATION NO. : 11/451969
DATED : December 22, 2009
INVENTOR(S) : Jang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Twenty-first Day of December, 2010

David J. Kappos
*Director of the United States Patent and Trademark Office*